United States Patent
Rapparini

[11] Patent Number: 5,354,133
[45] Date of Patent: Oct. 11, 1994

[54] RELIEF VALVE

[76] Inventor: Gino Rapparini, viale Roma 17, 40139 Bologna, Italy

[21] Appl. No.: 166,044

[22] Filed: Dec. 14, 1993

[30] Foreign Application Priority Data

Jun. 18, 1991 [IT]  Italy ................ BO 91 A 000213

[51] Int. Cl.$^5$ ................................ B65D 33/01
[52] U.S. Cl. .................... 383/103; 137/246; 137/533
[58] Field of Search .............. 383/100, 103; 220/745; 426/118; 137/246, 533, 533.19

[56] References Cited

U.S. PATENT DOCUMENTS

| | | | |
|---|---|---|---|
| 3,572,377 | 3/1971 | Graham et al. | 137/533.19 X |
| 3,799,427 | 3/1974 | Goglio . | |
| 3,949,934 | 4/1976 | Goglio | 383/103 |
| 4,271,241 | 6/1981 | Hooke et al. . | |
| 4,444,219 | 4/1984 | Hollenstein | 383/103 X |

FOREIGN PATENT DOCUMENTS

| | | | |
|---|---|---|---|
| 1195830 | 7/1965 | Fed. Rep. of Germany . | |
| 3146030 | 5/1983 | Fed. Rep. of Germany | 137/533 |
| 3125496 | 12/1983 | Fed. Rep. of Germany . | |
| 3229242 | 2/1984 | Fed. Rep. of Germany | 383/103 |
| 3147321 | 2/1985 | Fed. Rep. of Germany . | |
| 233865 | 8/1977 | France . | |
| 5124656 | 5/1993 | Japan | 383/103 |
| 2099958 | 12/1982 | United Kingdom . | |

*Primary Examiner*—Allan N. Shoap
*Assistant Examiner*—Jes F. Pascua

[57] ABSTRACT

A relief valve (6) includes a valve body (5), where a covering disk (1) holding a membrane (2) is completely built in. The axial dimension of the relief valve (6) coincides with the thickness of the valve body (5). The upper surface of the relief valve is flat. The application of the relief valve does not modify the external appearance of a container since the faying surface is also flat.

15 Claims, 2 Drawing Sheets

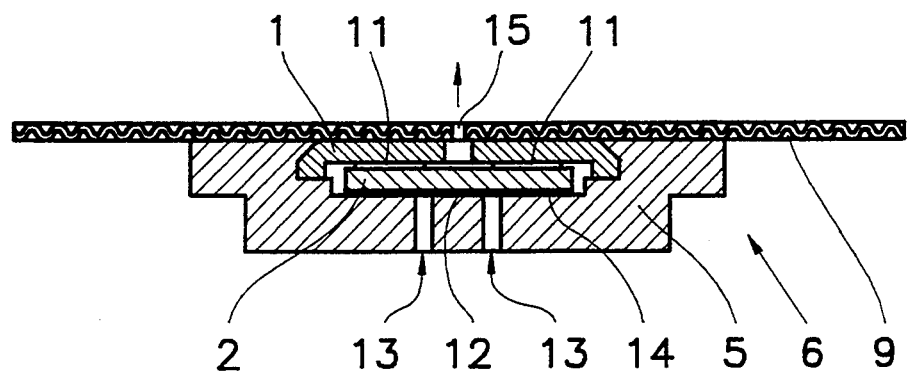
Fig. 1
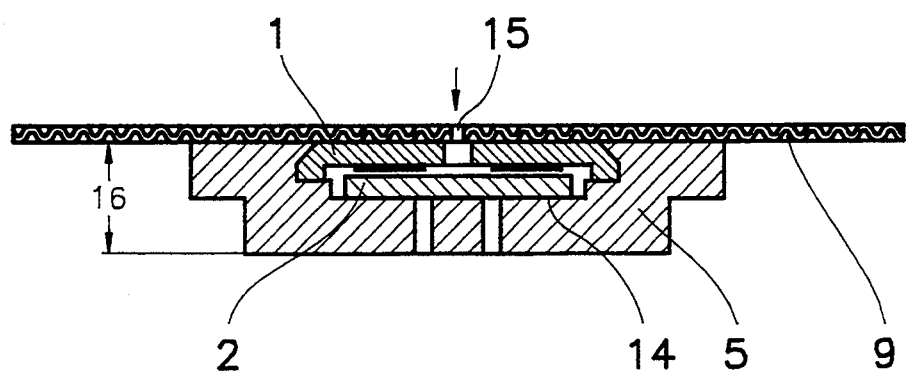
Fig. 2
Fig. 3a
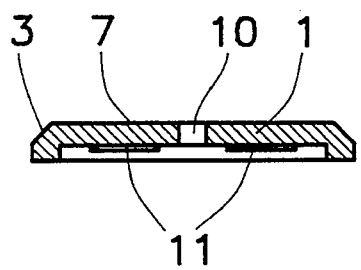
Fig. 3b
Fig. 3c
Fig. 3d
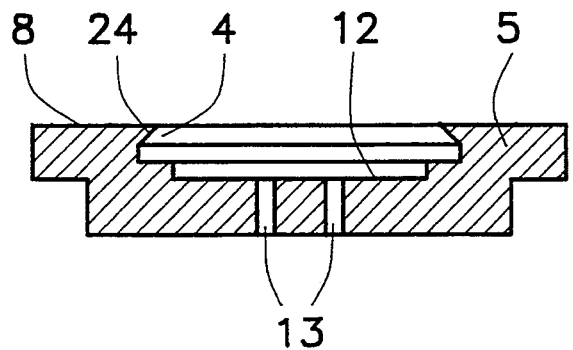

RELIEF VALVE

CROSS-REFERENCE TO RELATED APPLICATIONS

This application is a continuation-in-part application of another international application filed under the Patent Cooperation Treaty May 29, 1992, bearing Application No. PCT/IT92/00060, and listing the United States as a designated and/or elected country. The entire disclosure of this latter application, including the drawings thereof, is hereby incorporated in this application as if fully set forth herein.

BACKGROUND OF THE INVENTION

1. Field of the Invention

The present invention relates to a method of production of a relief valve including a valve body, where the upper surface of the relief valve is flat, and where the flat upper surface of the relief valve is fixedly connected to a flat inner surface of a container.

2. Brief Description of the Background of the Invention Including Prior Art

Relief valves are well known in the art. However, the known relief valves exhibit too high a thickness, thereby causing deformations of the packaged product. Another drawback of the known relief valves is that the diameter of the relief valve is too large and results in difficulties when handling the flexible material onto which the relief valve is applied. In addition, the application of the known valve may encounter major difficulties during thermowelding and/or thermosealing if the valve is not made out of a sufficiently soft material. It was found that the insertion of a known valve into an already punched hole of a package including a packaged product or of a flexible container may present centering difficulties.

Other problems in regard to the known relief valves concern the external appearance, the possibility of tampering, and the stacking difficulties of packages. The good operation of the known valve is jeopardized and the quality of the packaged product can be endangered where the relief valve is applied to the outside of a package or where the relief valve is disposed inside the package and protrudes due to its shape to the outside of the package.

The German Patent document DE-A-3,147,321 discloses an embodiment of a relief valve, where the relief valve includes a valve body with venting holes and a peripheral groove, a circular disk with a valve hole and with a slanted edge fitted into the peripheral groove, a membrane resting on the seal seat of the valve body, and of a viscous layer provided between the membrane and the seal seat. The relief valve of the German Patent document DE-A-3,147,321 is thermosealed to the inside wall of a flexible container, where the flexible container is provided with a venting hole.

The German Patent document DE-A-3,125,496 teaches a pressure control valve for venting of packing containers, where the valve itself protrudes from the outer surface of the packing container.

The German Patent document DE-C-1,195,830 teaches a relief valve intended for use in conjunction with a battery closure and to form an integral part of a battery or accumulator.

The French Patent document FR-A-2,338,865 discloses a safety valve disposed in a container. The actuating member of the safety valve is formed by a pressure means preferably made of a polyurethane foam. The safety valve is actuated if the pressure inside the container attains a predefined value.

The actuating portion of the pressure relief valve disclosed in the UK Patent document GB 2,099,958 again is formed by a synthetic foam disk. The disadvantage of this pressure relief valve is that this relief valve is adhesively attached to the outside of a container and thereby preventing formation of a flat outer surface of the container.

The U.S. Pat. No. 4,271,241 discloses a resealable valve for containers such as batteries. This valve is similar to the relief valve taught in the German Patent document DE-C-1,195,830.

The U.S. Pat. No. 3,799,427 discloses a degassing valve for hermetically sealed flexible containers and a container provided with the valve. This valve has to be inserted into a preexisting opening in the wall of a container and part of the valve projects from the outer wall of the container. The German Patent document 2,360,126 is an equivalent to the U.S. Pat. No. 3,799,427.

The art cited above shows certain elements which may have relevance with respect to the elements of the present invention.

SUMMARY OF THE INVENTION

1. Purposes of the Invention

It is an object of the present invention to provide for a relief valve which does not require a previous punching of an insertion hole on a flexible belt and/or flexible web forming a packaging product or container, and where centering operations of the relief valve relative to the packaging product can thereby be dispensed with.

It is a further object of the present invention to provide for a relief valve, where the relief valve is directly placeable onto a non-punched belt or web.

It is yet another object of the present invention to provide a relief valve, where the relief valve acts as a counter plate for the formation of a simultaneous relief hole.

These and other objects and advantages of the present invention will become evident from the description which follows.

2. Brief Description of the Invention

The present invention provides for a relief valve. A valve body has in part an upper flat surface, a valve seal seat disposed on its upper side outside of said flat surface, a valve body venting hole disposed in the area of the valve seal seat, and a peripheral groove recessed into the upper side of the valve body and surrounding the valve seal seat. A covering disk has an upper flat surface having a venting hole and a slanted edge fitted into the peripheral groove. The upper flat surface of the covering disk is coplanar with the upper flat surface of the valve body thereby forming a coplanar plane. A membrane rests on the valve seal seat of the valve body. A viscous layer is disposed between the membrane and the valve seal seat. The axial overall dimension of the assembled relief valve is defined by the thickness of the valve body. The coplanar plane, formed by the upper flat surface of the covering disk and by the upper flat surface of the valve body, is provided for thermosealing said relief valve to an inner sidewall of a flexible container, where the inner sidewall is provided with a relief hole. Said relief valve thereby presents a flat facing surface toward the inner sidewall of said flexible container.

The covering disk can be of circular form.

The venting hole of the covering disk can be located centrally relatively to a position of the slanted edge. The coplanar plane, formed by the upper flat surface of the covering disk and the upper flat surface of the valve body, can act as a counter plate for punching a corresponding relief hole into the flexible container.

Protruding ribs can be disposed on a lower surface of the covering disk opposite to said membrane for providing flow channels which communicate with the venting hole of the covering disk. The protruding ribs can be directed substantially radially away from said venting hole of the covering disk.

Alternatively, protruding ribs can be disposed on an upper surface of the membrane and opposite to said covering disk for providing flow channels which communicate with the venting hole of the covering disk. The protruding ribs can be directed substantially radially away from a center of the membrane.

A flexible container including a relief hole can be disposed against the coplanar plane formed by the upper flat surface of the covering disk and the upper flat surface of the valve body.

The relief hole of the flexible container can be disposed directly opposite to the venting hole of the covering disk.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown several of the various possible embodiments of the present invention:

FIG. 1 is a schematic sectional view of a valve applied to the inside of a container in relief position;

FIG. 2 is a schematic sectional view of the valve of FIG. 1 in sealing position;

FIG. 3a is a detailed sectional view of the covering disk of the valve shown in FIGS. 1 and 2;

FIG. 3b is a detailed view of the seal membrane of the valve shown in FIGS. 1 and 2;

FIG. 3c is a detailed view of the viscous sealing layer of the valve shown in FIGS. 1 and 2;

FIG. 3d is a detailed view of the valve body of the valve shown in FIGS. 1 and 2;

DESCRIPTION OF INVENTION AND PREFERRED EMBODIMENT

Figure 4:
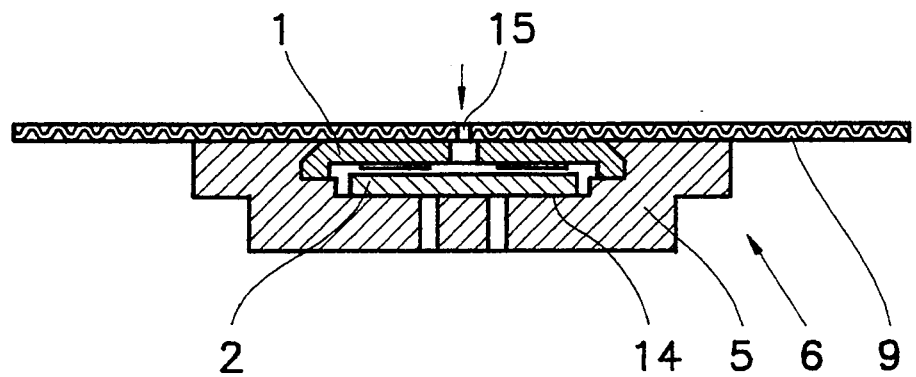
FIG. 4 shows a sectional view of a second embodiment, where ribs are placed on the seal membrane.

According to the present invention there is provided for a relief valve. A valve body 5 includes valve body venting holes 13 and a peripheral groove 4. The valve body 5 exhibits a flat upper surface 8. A covering disk 1 with a disk venting hole 10 and with a slanted edge 3 is fitted into the peripheral groove 4 of the valve body 5. The covering disk 1 exhibits a flat upper surface 7. A membrane 2 rests on a seal seat 12 of the valve body 5. A viscous sealing layer 14 is provided between the membrane 2 and the seal seat 12. The membrane 2 and the covering disk 1 are fitted into the valve body 5 and form a relief valve 6. A flexible container 9 includes a relief hole 15. The relief valve 6 is thermosealed to an inside wall of the flexible container 9. The relief valve 6, when assembled, exhibits an overall axial thickness which coincides with the thickness of the valve body 5. The flat upper surface 7 of the covering disk 1 is coplanar with the flat upper surface 8 of the valve body 5 such that the relief valve presents a flat surface facing an inner wall of the flexible container 9.

The disk venting hole 10 can be disposed centered in the covering disk 1. The disk venting hole 10 of the covering disk 1 can act as a counter plate for punching a relief hole 15 into the flexible container 9. The relief hole 15 can be positioned such at a location corresponding to a position of the disk venting hole 10.

Protruding ribs 11 can be disposed on a surface of the covering disk 1 disposed opposite to the membrane 2. The protruding ribs 11 can provide flow channels communicating from the valve body venting hole 13 with the disk venting hole 10 and the relief hole 15.

According to the present invention, there is provided for a relief valve 6 including a valve body 5 with valve body venting holes 13, a covering disk 1, a sealing membrane 2, a sealing viscous layer 14, and a seal seat 12. The relief valve 6 is thermosealed to an inside wall of a flexible container 9. The container 9 is provided with a relief hole 15. The overall axial dimension, i.e. the thickness 16 of the assembled relief valve 6 is substantially the same as the thickness of the valve body 5.

FIG. 1 shows a flexible container 9 in its wall section. The wall of the flexible container 9 exhibits a flat section. The flat section of the flexible container 9 is furnished with a circular relief hole 15 punched or drilled into the container 9. Adjacent to the wall of the container 9 is provided a valve body 5 and a covering or circular disk 1. The covering disk 1 is solidly placed into the valve body 5. The surface 7 of the covering disk 1 and the surface 8 of the valve body 5 are flat and are disposed together against one side of the wall of the flexible container 9. The covering disk 1 is formed essentially flat and is furnished with a disk central bore or centered disk venting hole 10. The covering disk 1 preferably is provided of a circular shape giving a circular disk. The centered disk venting hole 10 is disposed immediately opposite to the relief hole 15 punched or drilled in the flexible container 9 such that a flow of gas or liquid is possible through the centered disk venting hole 10 and the relief hole 15 of the container 9.

The valve body 5 is furnished with a seat for holding the covering disk 1 in place, and this seat can be provided as a peripheral disk groove 4. The peripheral disk groove 4 is formed at the flat upper surface 8 of the valve body 5 such that the disk recess of the valve body 5 for placing the covering disk 1 forms a retaining recess at the edges of the disk recess. In particular, a retaining recess is provided at the peripheral disk groove 4 such that the wall of the retaining recess 24 forms an angle of from about 30 to 60 degrees relative to the flat upper surface 8 of the valve body 5.

Preferably, the upper surface 8 of the valve body 5 in its central area is formed as circular disk recess with cylinder-shape walls, where the diameter of the cylinder is slightly larger than the diameter of the sealing membrane 2 and forms a first cylindrical section. The diameter of the first cylindrical section can be from about 10 times to 50 times the thickness of the sealing membrane 2. Adjoining to this first cylindrical section is a second cylindrical section which is provided for the covering disk 1 and which allows for a somewhat larger diameter such that the covering disk 1, having a larger diameter as compared to the sealing membrane 2, can be put in place in the valve body 5. This second cylindrical section, together with a frustoconical section narrowing from the second cylindrical section toward the upper surface 8 of the valve body 5, form the peripheral disk groove 4. The covering disk 1 is formed with a recess on its side toward the upper surface 8 of the valve body 5 in its center region such that the recess of the covering disk 1 corresponds in its diameter and in its depth substantially to the diameter and the depth of the first cylindrical section.

The provision of the peripheral disk groove 4 prevents the covering disk 1 from leaving its position and assures that the covering disk 1 is retained in the valve body 5. Preferably, the covering disk 1 is of a circular and cylindrical symmetry but, alternatively, it can also be formed like a slider fitting into the valve body 5. The peripheral disk groove 4 of the valve body 5 is formed such that it not only retains the beveled outer front edge face 3 of the covering disk 1 but also covers the rear wall of the covering disk 1 at the surrounding edges of the covering disk 1. Thus, the covering disk 1 is fixedly disposed in the valve body 5. The valve body 5 further extends all over the rear or second flat side of the covering disk 1 with the exception of two boreholes or valve body venting holes 13. The valve body 5 can have an overall thickness of from about 4 to 10 times the thickness of the sealing membrane 2.

The two venting holes 13 are preferably provided in a position which corresponds substantially to the covering disk's 1 position of the centered disk venting hole 10. The valve body venting holes 13 are preferably disposed within the inner radial third of the sealing membrane 2. The center rear side of the covering disk 1 together with the center front side of the valve body 5 leave an intermediate opening. This opening is essentially flat and a sealing membrane 2 is substantially disposed in this opening. The sealing membrane 2 is provided such that it can perform a motion in the space left between the covering disk 1 and the valve body 5 and, in particular, such that this motion can be in a direction perpendicular to the upper surface 7 of the covering disk 1 and therefore also perpendicular to the upper surface 8 of the valve body 5. The sealing membrane 2 is placed in this opening such that it can allow passage of fluid between the sealing membrane 2 and the covering disk 1 and simultaneously between the sealing membrane 2 and the upper surface 8 of the valve body 5 in a central surface area of the valve body 5 forming a valve seat or membrane seal seat 12. In such a position, the relief valve is opened. The sealing membrane 2 can assume a second position, where the sealing membrane 2 is disposed relatively remote from the covering disk 1 and is closely disposed toward the upper surface 8 of the valve body 5 in the central surface area of the valve body 5 forming the membrane seal seat 12. In this situation the relief valve is closed.

It can be gathered from FIG. 1, that the relief action of the relief valve results from a lifting of the sealing membrane 2 from the seal seat 12 of the valve body 5, and to the presence of protruding ribs 11 of the covering disk 1, wherein the sealing membrane 2 rests against the protruding ribs 11 of the covering disk 1 in such a way that a flow is provided between the inside of a container and the outside of a container.

Figure 5A:
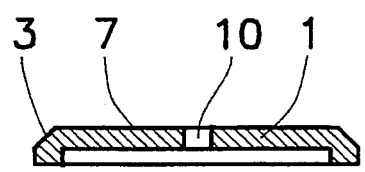
FIG. 5a is a detailed sectional view of the covering disk of the valve shown in FIG. 4.
Figure 5B:
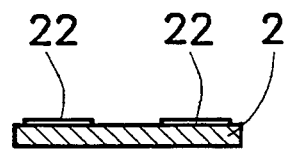
FIG. 5b is a detailed view of the seal membrane of the valve shown in FIG. 4.
Figure 5C:
FIG. 5c is a detailed view of the viscous sealing layer of the valve shown in FIG. 4.
Figure 5D:
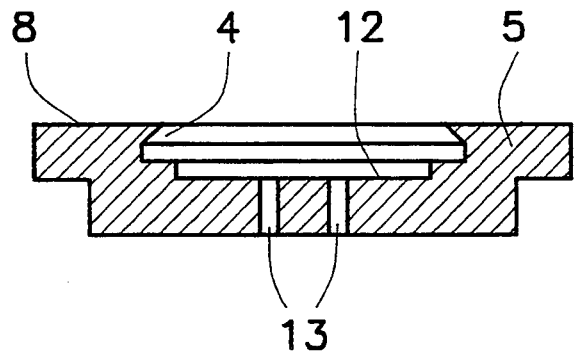
FIG. 5d is a detailed view of the valve body of the valve shown in FIG. 4.

The sealing membrane 2 cannot move completely up to the lower recessed surface of the covering disk 1 behind the ribs 11 in order to allow at all times a passage of a flow coming from the relief hole 15 punched or drilled into the container 9 and coming from the centered disk venting hole 10 toward the covering disk 1. This effect is provided by furnishing protruding ribs 11 attached to the covering disk 1 as shown in FIGS. 2 and 3 for stopping the sealing membrane 2. Alternatively, it is possible to provide protruding membrane ribs 22 on the sealing membrane 2 which similarly provide for a spacing between the sealing membrane 2 and the covering disk 1 thus allowing at all times a passage of fluid flow and allowing to dispense with the ribs on the covering disk, as illustrated in FIGS. 4 and 5a to 5d.

Under particular conditions of an overpressure inside the container, gases to be eliminated pass through valve body venting holes 13, lift the sealing membrane 2 and flow through the protruding ribs 11 and through the centered disk venting hole 10 and the relief hole 15 to the outside of the container.

In order to provide a reliable and safe closure of the relief valve, a sealing viscous layer 14 is provided, where the sealing viscous layer 14 is disposed between the sealing membrane 2 and the upper surface 8 of the valve body 5 in its central area. Thus, if the sealing membrane 2 moves toward the upper surface 8 of the valve body 5 in its central area, then the sealing membrane 2 provides a tight closure of the valve body venting holes 13, and the relief valve is closed. The protruding disk ribs 11 or the protruding membrane ribs 22 are preferably disposed radially extending from the center, defined by the centered disk venting hole 10, in case of a valve with radial symmetry. The protruding ribs 11, formed at the lower surface of the covering disk 1 and disposed opposite to the sealing membrane 2, can provide flow channels which communicate with the venting holes 10 of the covering disk 1 and the relief holes 15 of the container 9. The depth of the protruding disk ribs 11 can be from about $1/20^{th}$ to $1/5^{th}$ of the thickness of the sealing membrane 2.

The sealing membrane 2 can be provided at its outer edge with spacer elements which define its precise position inside the opening between the covering disk 1 and the valve body 5. This would keep the sealing membrane 2 and also the sealing viscous layer 14 in position. It is also possible that the sealing viscous layer 14 is attached to the sealing membrane 2.

The sealing action of the relief valve results from an adhesion of the sealing membrane 2 to the seal seat 12 of the valve body, as illustrated in FIG. 2. This sealing action is optimized by the presence of the sealing viscous layer 14 which ensures the hermetic seal of the container 9 after any overpressure has been relieved and/or vented from the inside of the container.

FIGS. 3a to 3d show the various elements of the relief valve and how these elements are assembled to form the relief valve. FIG. 3a illustrates the covering disk 1 having slanted edges 3 and a planar upper surface 7. The covering disk 1 exhibits a centered disk venting hole 10.

Protruding ribs 11 are attached to the lower surface of the covering disk 1. FIG. 3b illustrates the sealing membrane 2 and FIG. 3c shows the viscous sealing layer 14. FIG. 3d illustrates the valve body 5 including a peripheral groove 4, a seal seat 12, and valve body venting holes 13. The sealing membrane 2 of FIG. 3b rests against the seal seat 12 of the valve body 5 of FIG. 3d. The viscous sealing layer 14 of FIG. 3c is provided between the sealing membrane 2 of FIG. 3b and the seal seat 12 of the valve body 5 of FIG. 3d in order to provide an optimum sealing action. The covering disk 1 of FIG. 3a is fitted into the peripheral groove 4 of the valve body 5 of FIG. 3d.

The flat upper surface 7 of the covering disk 1 is coplanar with the flat upper surface 8 of the valve body 5 such that said relief valve presents a flat surface facing towards the inner wall of the flexible container 9.

The covering disk 1 can exhibit a centered venting hole 10 acting as a counter plate for punching the relief hole 15 into the flexible container 9, where the opening of the relief hole 15 corresponds to the opening of the venting hole 10 of the covering disk 1.

The valve body 5 can be made of any material which is stable and non-corrosive. A material suitable for the valve body 5 includes metals, plastics, and the like. The sealing membrane 2 can similarly be made of any material which substantially retains its shape such as plastic, rubber, metal. The sealing viscous layer 14 is preferably made out of a soft material which is elastically deformable, such as rubber or soft plastic. The covering disk 1 can be made of a material similar to that which is used for the valve body 5.

The valve body 5 can be furnished at its outside with a corner recess and surrounds on the lower wall of the valve body 5 such as to allow an improved attachment of the valve body 5 to the flexible container 9.

It will be understood that each of the elements described above, or two or more together, may also find a useful application in other types of relief valves differing from the types described above.

While the invention has been illustrated and described as embodied in the context of a relief valve mounted to the inside of a flexible container, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A relief valve comprising
   a valve body having in part an upper flat surface, having a valve seal seat disposed on its upper side outside of said flat surface, having a valve body venting hole disposed in the area of the valve seal seat, and having a peripheral groove recessed into the upper side of the valve body and surrounding the valve seal seat;
   a covering disk having an upper flat surface having a venting hole and having a slanted edge fitted into the peripheral groove, wherein the upper flat surface of the covering disk is coplanar with the upper flat surface of the valve body thereby forming a coplanar plane;
   a membrane resting on the valve seal seat of the valve body;
   a viscous layer disposed between the membrane and the valve seal seat, wherein the axial overall dimension of the assembled relief valve is defined by the thickness of the valve body, and wherein the coplanar plane, formed by the upper flat surface of the covering disk and by the upper flat surface of the valve body, is provided for thermosealing said relief valve to an inner sidewall of a flexible container, wherein the inner sidewall is provided with a relief hole, and wherein said relief valve thereby presents a flat facing surface toward the inner sidewall of said flexible container.

2. The relief valve according to claim 1, wherein the covering disk is of circular form.

3. The relief valve according to claim 1, wherein the venting hole of the covering disk is located centrally relatively to a position of the slanted edge, and wherein the coplanar plane formed by the upper flat surface of the covering disk and the upper flat surface of the valve body acts as a counter plate for punching a corresponding relief hole into the flexible container.

4. The relief valve according to claim 3, further comprising
   protruding ribs disposed on a lower surface of the covering disk opposite to said membrane for providing flow channels which communicate with the venting hole of the covering disk.

5. The relief valve according to claim 3, further comprising
   protruding ribs disposed on a lower surface of the covering disk opposite to said membrane and directed substantially radially away from said venting hole of the covering disk for providing flow channels which communicate with the venting hole of the covering disk.

6. The relief valve according to claim 3, further comprising
   protruding ribs disposed on an upper surface of the membrane and opposite to said covering disk for providing flow channels which communicate with the venting hole of the covering disk.

7. The relief valve according to claim 3, further comprising
   protruding ribs disposed on an upper surface of the membrane and opposite to said covering disk and directed substantially radially away from a center of the membrane for providing flow channels which communicate with the venting hole of the covering disk.

8. The relief valve according to claim 1, further comprising a flexible container including a relief hole and disposed against the coplanar plane formed by the upper flat surface of the covering disk and the upper flat surface of the valve body.

9. The relief valve according to claim 8, wherein the relief hole of the flexible container is disposed directly opposite to the venting hole of the covering disk.

10. A relief valve consisting of a valve body (5) with venting holes (13) and a peripheral groove (4), a covering disk (1) with a venting hole (10) and with a slanted edge (3) fitted into the peripheral groove (4), a membrane (2) resting on a seal seat (12) of the valve body (5), and a viscous layer (14) provided between the membrane (2) and the seal seat (12), said relief valve being thermosealed to the inside wall of a flexible container (9) which is provided with a venting hole, characterized in that the axial overall dimension (6) of the assembled relief valve coincides with the thickness of the valve body (5) and an upper flat surface (7) of the covering disk (1) is coplanar with an upper flat surface (8) of the valve body (5) such that said relief valve presents a flat facing surface toward the internal wall of said flexible container (9).

11. A relief valve according to claim 10, characterized in that the covering disk (1) presents a central venting hole (10) acting as a counter plate for punching the corresponding relief hole (15) in the flexible container (9).

12. A relief valve according to claim 10, characterized in that the protruding ribs (11) in the surface of the covering disk (1) opposite to membrane provide flow channels which communicate with venting holes (10) and (15).

13. A relief valve comprising
   a valve body (5) with valve body venting holes (13) and a peripheral groove (4), wherein the valve body (5) exhibits a flat upper surface (8);
   a covering disk (1) with a disk venting hole (10) and with a slanted edge (3) fitted into the peripheral groove (4) of the valve body (5), wherein the covering disk (1) exhibits a flat upper surface (7);
   a membrane (2) resting on a seal seat (12) of the valve body (5);
   a viscous sealing layer (14) provided between the membrane (2) and the seal seat (12), wherein the membrane (2) and the covering disk (1) are fitted into the valve body (5) and form a relief valve (6);
   a flexible container (9) including a relief hole (15);
   wherein the relief valve (6) is thermosealed to an inside wall of the flexible container (9), wherein the relief valve (6), when assembled, exhibits an overall axial thickness which coincides with the thickness of the valve body (5), and wherein the flat upper surface (7) of the covering disk (1) is coplanar with the flat upper surface (8) of the valve body (5) such that the relief valve presents a flat surface facing an inner wall of the flexible container (9).

14. The relief valve according to claim 13, wherein the disk venting hole (10) is disposed centered in the covering disk (1), and wherein the disk venting hole (10) of the covering disk (1) acts as a counter plate for punching a relief hole (15) into the flexible container (9), wherein the relief hole (15) is positioned such at a location corresponding to a position of the disk venting hole (10).

15. The relief valve according to claim 14, further comprising
   protruding ribs (11) disposed on a surface of the covering disk (1) disposed opposite to the membrane (2), wherein the protruding ribs (11) provide flow channels communicating from the valve body venting hole (13) with the disk venting hole (10) and the relief hole (15).

* * * * *